No. 671,669. Patented Apr. 9, 1901.
S. D. HOOLE.
WHEAT CLEANING MACHINE.
(Application filed July 22, 1899.)
(No Model.) 2 Sheets—Sheet 1.
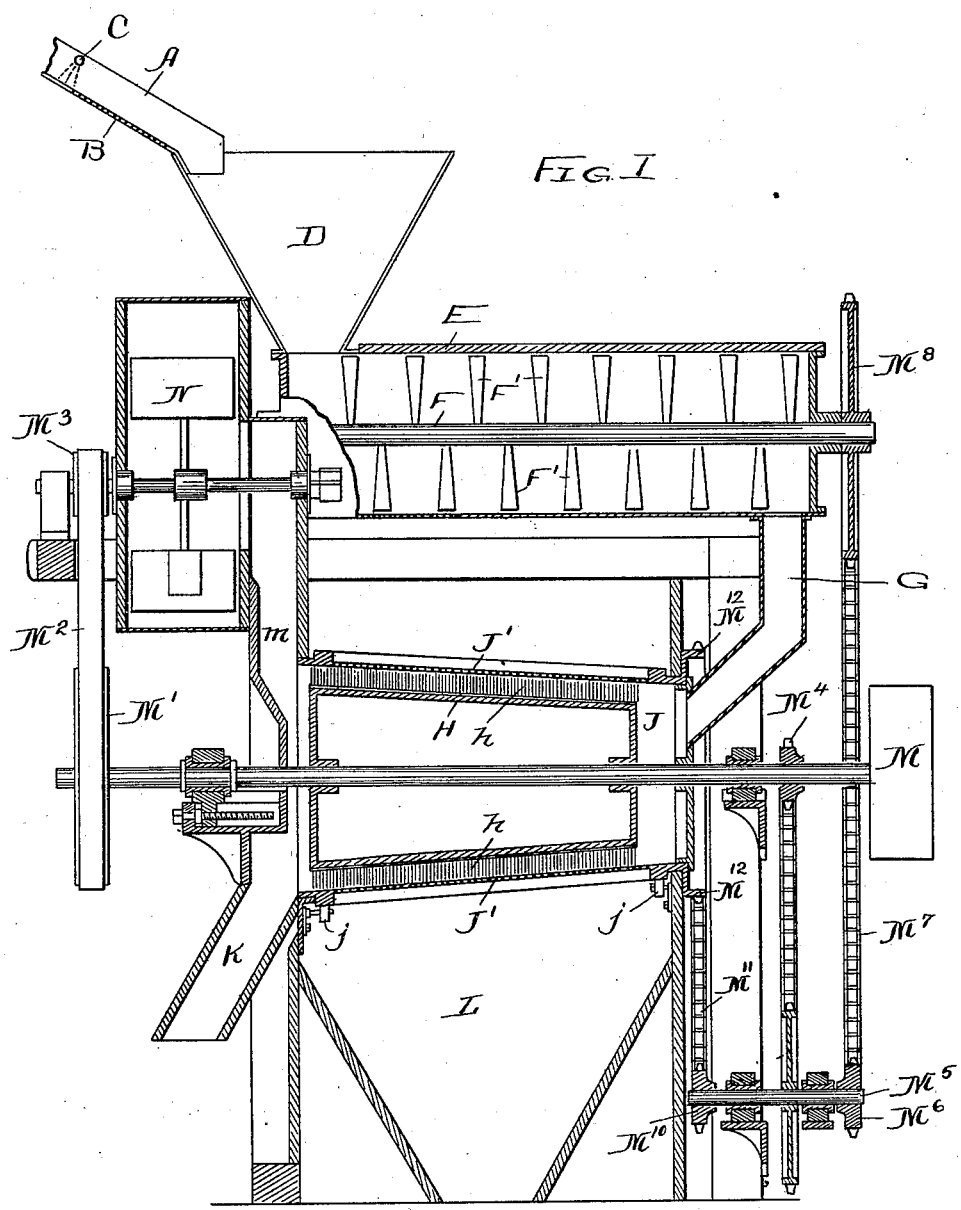
FIG. I
WITNESSES:
Lew. C. Curtis
H. W. Munday
INVENTOR:
SAMUEL D. HOOLE
BY Munday, Evarts & Adcock
HIS ATTORNEYS.

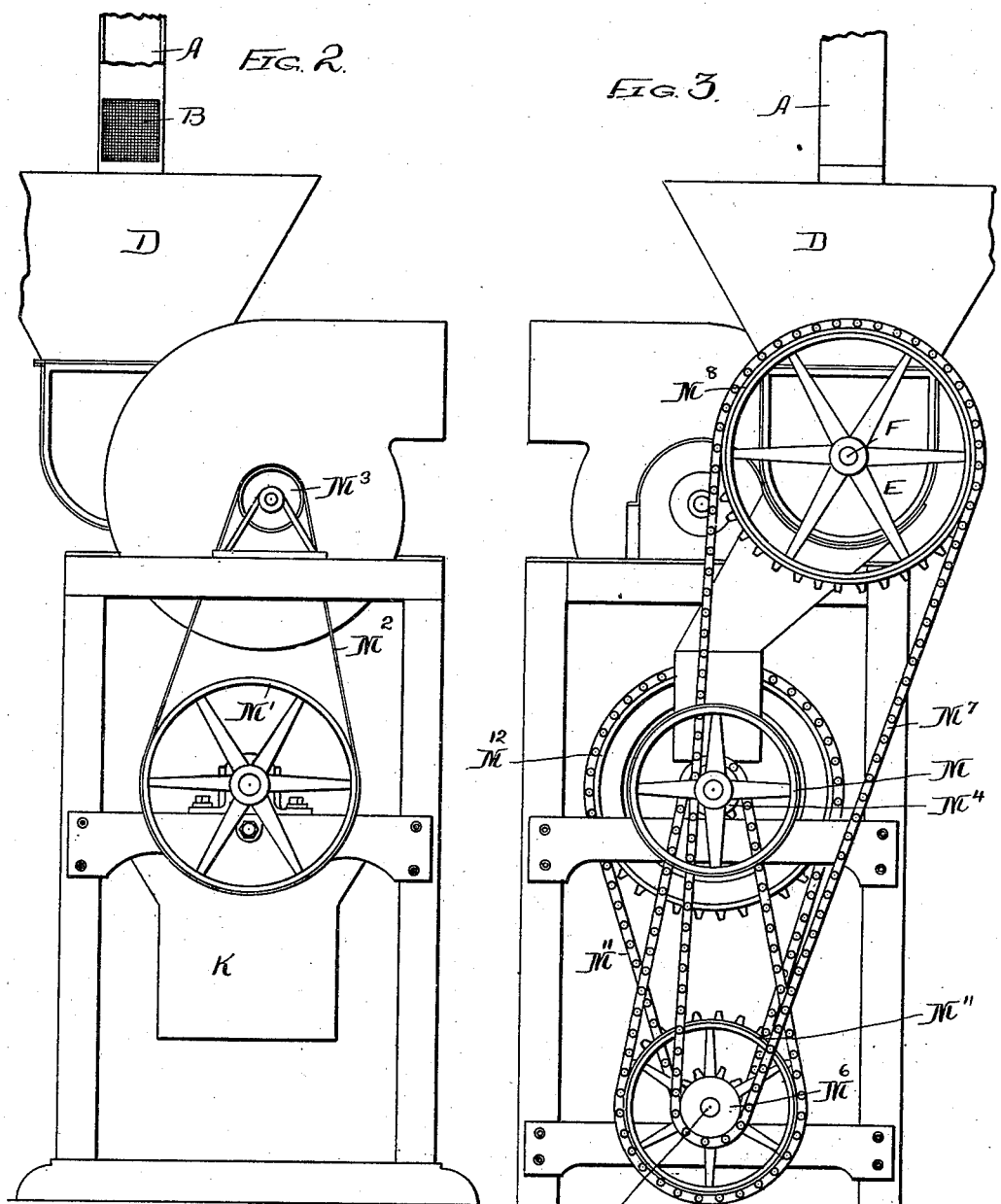

UNITED STATES PATENT OFFICE.

SAMUEL D. HOOLE, OF CHICAGO, ILLINOIS, ASSIGNOR TO SAMUEL D. HOOLE AND JOHN J. MILLER, OF SAME PLACE.

WHEAT-CLEANING MACHINE.

SPECIFICATION forming part of Letters Patent No. 671,669, dated April 9, 1901.

Application filed July 22, 1899. Serial No. 724,734. (No model.)

*To all whom it may concern:*

Be it known that I, SAMUEL D. HOOLE, a citizen of the United States, residing in Chicago, in the county of Cook and State of Illinois, have invented a new and useful Improvement in Wheat-Cleaning Machines, of which the following is a specification.

This invention relates to a machine for cleaning wheat—that is to say, for removing the outer coverings of the berry from all parts thereof down to the inner skin without injuring or penetrating said inner skin; and the invention consists in the machine hereinafter more fully described and claimed.

In the accompanying drawings, which form a part of this specification, Figure 1 is a vertical longitudinal section of the invention. Fig. 2 is an end elevation of the same, showing one end of the machine; and Fig. 3 is an end elevation showing the other end of the machine.

Like letters of reference denote like parts in each of the figures.

In said drawings, A is a feed-spout for feeding the wheat to the apparatus. This spout may lead directly from a bin or granary where the dry wheat is kept or stored and is shown as being inclined at an angle to the horizon. The bottom of this spout is preferably perforated or made with wire-netting, as at B, and leading into the spout above the netting is a sprinkler-pipe C, from which water sprinkles continually upon the wheat flowing through the spout. A valve (not shown) may regulate the amount of water delivered to the grain. The excess of water beyond what will cling to the grain flows down and out through the netting B. From the spout A the wheat, now with water clinging to the outside of the berries, runs into the receiving hopper or funnel D, which in the example machine illustrated is designed to hold about four bushels.

Below the hopper is a stirring-chamber, consisting of a cylindrical chamber E, provided with a shaft F, having a series of blades F', arranged to operate as a screw conveyer when the shaft revolves, as it does continually while the machine is in operation. In the example illustrated this cylindrical chamber is designed to hold about five bushels of wheat, and it is constructed to move the mass of wheat at such rate of speed as to receive at one end and deliver at the other and preferably about one bushel per minute, which, it will be seen, would leave the wheat in contact with the moisture and water about four minutes. G is the exit-spout from this stirring-chamber, and it leads to the brush directly.

The brush is shown at H. It consists of a tapering circular body provided with the bristles $h$, made of monkey-bast fiber. This "monkey-bast" is a woody fiber which may be obtained in the market and is of such nature that when it rubs against the wheat it is stiff enough to remove the outer coverings of the berry and yet will not scratch the inner skin. It is also elastic and of such nature that the bristles will penetrate the crease in the berry, so that the outer coverings will be removed from the crease in the berry, as well as from the rest of the wheat. This tapering circular brush, composed of the bristles above stated, is mounted on and continually rotated by a shaft and is inclosed in a circular tapering chamber J, the sides of which, J', are formed of wire-netting, and the tip ends of the brush come nearly to said netting.

The purpose of making the brush and its chamber of a tapering or conical form is to give opportunity for adjustment for wear as the brush wears out.

The shaft carrying the brush is shown as being mounted at one end in a fixed bearing, through which it may slide endwise, and at the other end in a movable bearing, which may be adjusted by a screw, there being collars on the shaft at each side of this movable bearing. By turning the screw the conical brush may be set in or out of its conical chamber as it wears. The moist wheat fed into this brush is carried around and around and delivered at the outer end entirely denuded, including the crease in the berry, of all its outer covering and beard or fuzz down to the inner skin by the action of the elastic wood fiber or monkey-bast bristles. From the brush the clean wheat falls into the final spout K, whence, if it be in proper condition as to moisture, it may be conveyed directly to the grinding-rolls or millstones. The fuzz or beard and the smaller fragments of shell cling to the wire-netting of the brush-chamber and pass through its interstices into the dust-spout L. The larger fragments and coating of the shell pass out with the cleaned wheat to the exit or brush chamber, where they are caught up by a suction-current through the trunk m, caused by the air-fan N, and delivered at the separate point.

The wire-netting-sided brush-chamber is mounted so that it will revolve also, as well as the brush it contains. In the example illustrated the direction of revolution of the chamber is the same direction as that of the brush, but at a much slower speed, the relative speeds being in this instance as fifteen to two hundred. The purpose of giving a revolving motion to this chamber is to cause its various portions to come, one after another, underneath, so that the fine material caught in the meshes of the netting may fall out. The construction shown in the drawings, whereby this capacity of revolution is given and the motion imparted to said chamber, consists in a hollow bearing at each end of the said chamber, and this may be furnished with small friction-rollers j, upon which the weight of the conical chamber rests, and to the smaller end of the cone a rag wheel or gear connected by a chain to the moving mechanism gives the revolving motion required.

The gearing of the machine shown in the drawings may be traced as follows: N is the driving-pulley, mounted on the main or brush shaft and driving the brush. At the other end this shaft carries a pulley N', connected by a belt $M^2$ to the shaft $M^3$ of the frame. Also on this same main shaft is mounted the small rag-pinion $M^4$, geared by a chain to the short counter-shaft $M^5$, which carries at one end the rag-pinion $M^6$, connected by chain $M^7$ with the rag-wheel $M^8$ on the shaft F of the stirring-chamber conveyer and carrying at the other end the rag-pinion $M^{10}$, connected by a chain $M^{11}$ with rag-wheel $M^{12}$ on the revolving brush-chamber.

I have discovered that in the cleaning of moistened wheat it is extremely important that the rubbing action for removing the outer coverings should be performed by a surface in the form of a brush composed of bristles of a woody fiber or material which shall be stiff enough to rub off the said outer coverings, and yet which will not be so hard as to scratch or destroy the inner skin, and by experiment I have demonstrated that a brush composed of what is known as "monkey-bast," which is a woody fiber coming to our market from tropical countries, as I am informed, exactly answers these requirements in every respect when used in a machine of the character above described.

I claim—

1. The wheat-cleaning apparatus consisting in the combination of the following instrumentalities: the mechanism for moistening the wheat, which consists of a water-supply and a stirring device; second, the brush-chamber for containing the revolving brush; third, the revolving brush, the bristles whereof are formed of elastic material which is adapted to remove all the moistened outer covering and impurities from the berry, but not to penetrate the surface of the inner skin; fourth, means for conveying the grain from the moistening device to the brush, all substantially as and for the purpose set forth.

2. The wheat-cleaning apparatus consisting in the combination of the following instrumentalities: the mechanism for moistening the wheat, which consists of a water-supply and a stirring device; second, the brush-chamber for containing the revolving brush; third, the revolving brush, the bristles whereof are composed of monkey-bast; fourth, means for conveying the grain from the moistening device to the brush, all substantially as and for the purpose set forth.

SAMUEL D. HOOLE.

Witnesses:
H. M. MUNDAY,
L. E. CURTIS.